Jan. 7, 1930.　　　　T. J. BURKE　　　　1,742,687
LIFE AND VESSEL SAVING EQUIPMENT
Filed Nov. 26, 1926　　　9 Sheets-Sheet 1
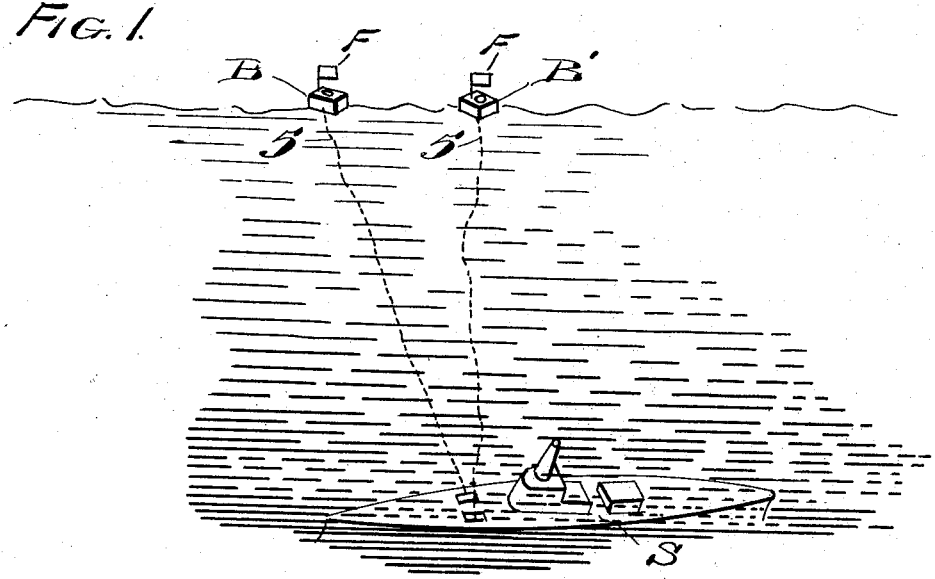
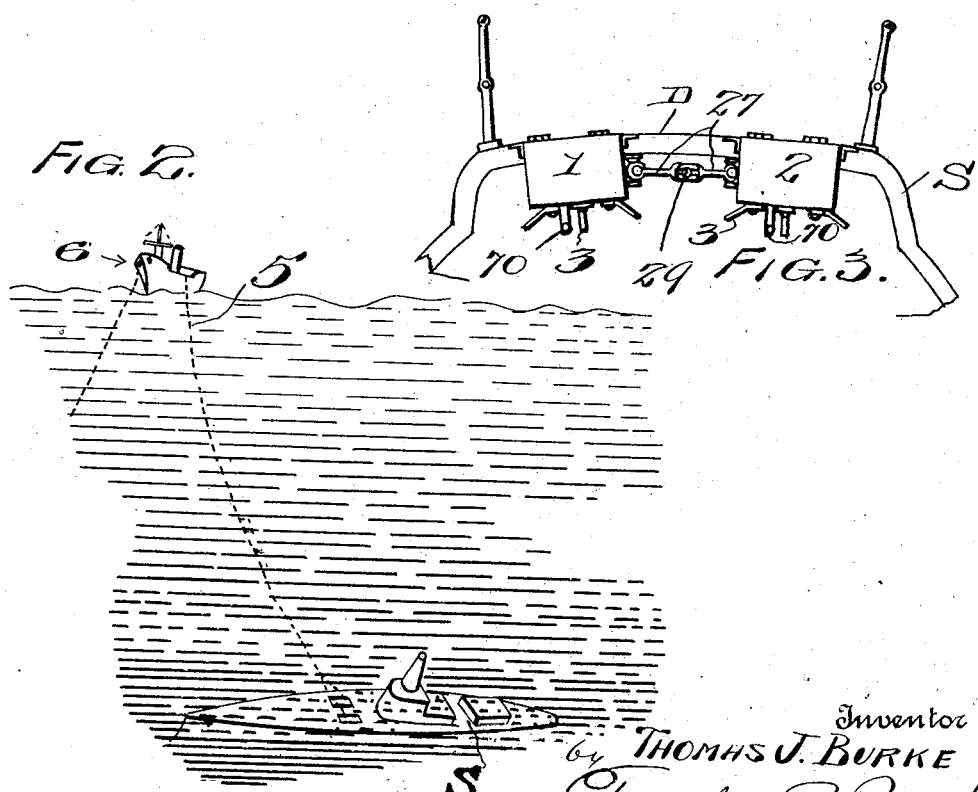

Jan. 7, 1930.  T. J. BURKE  1,742,687
LIFE AND VESSEL SAVING EQUIPMENT
Filed Nov. 26, 1926  9 Sheets-Sheet 2
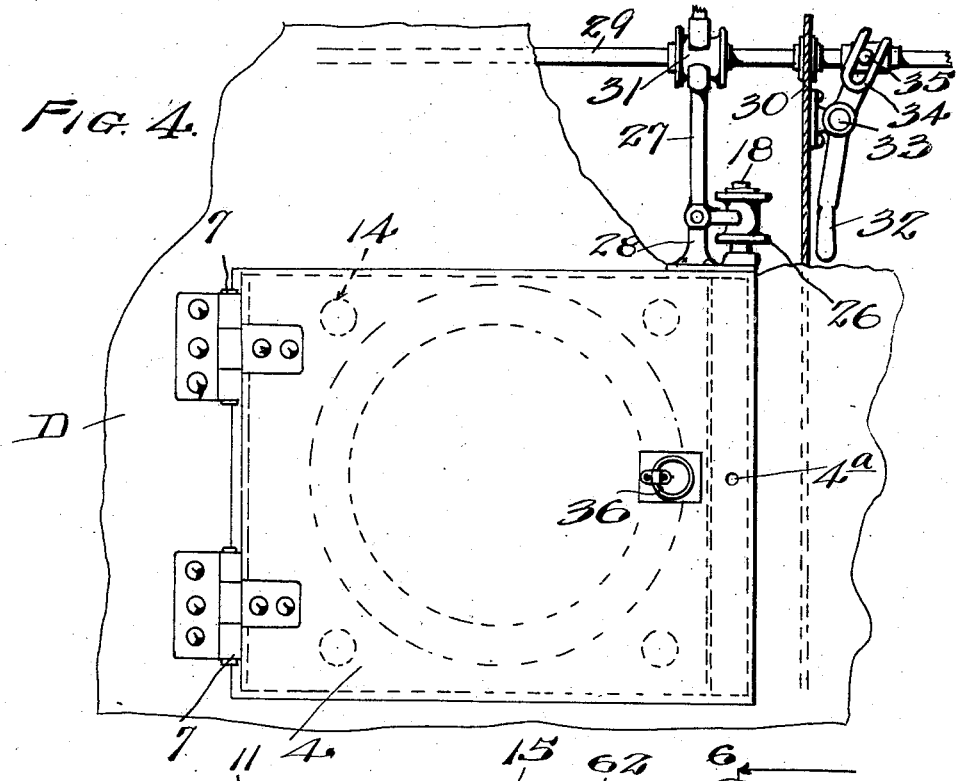
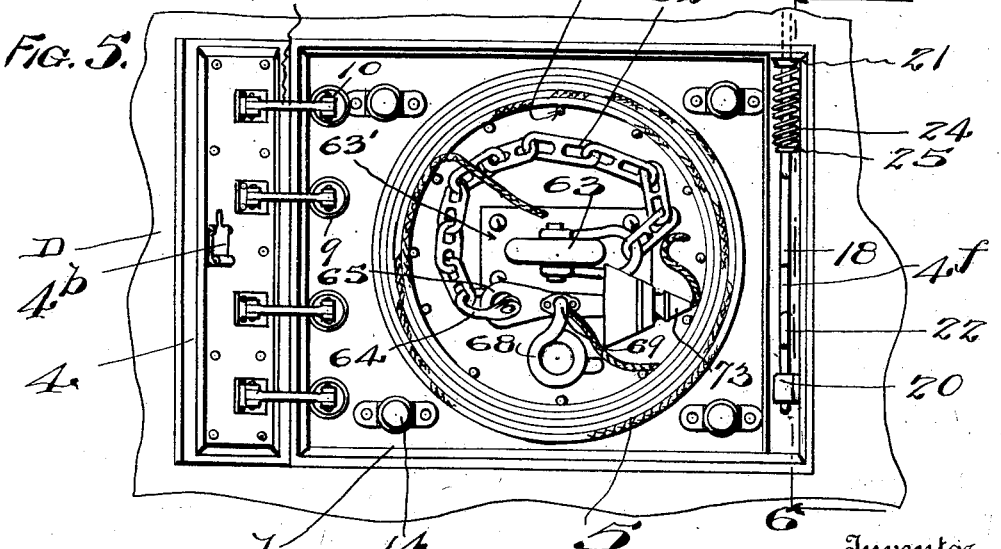
Inventor
THOMAS J. BURKE
By Fenelon B. Brock
Attorney

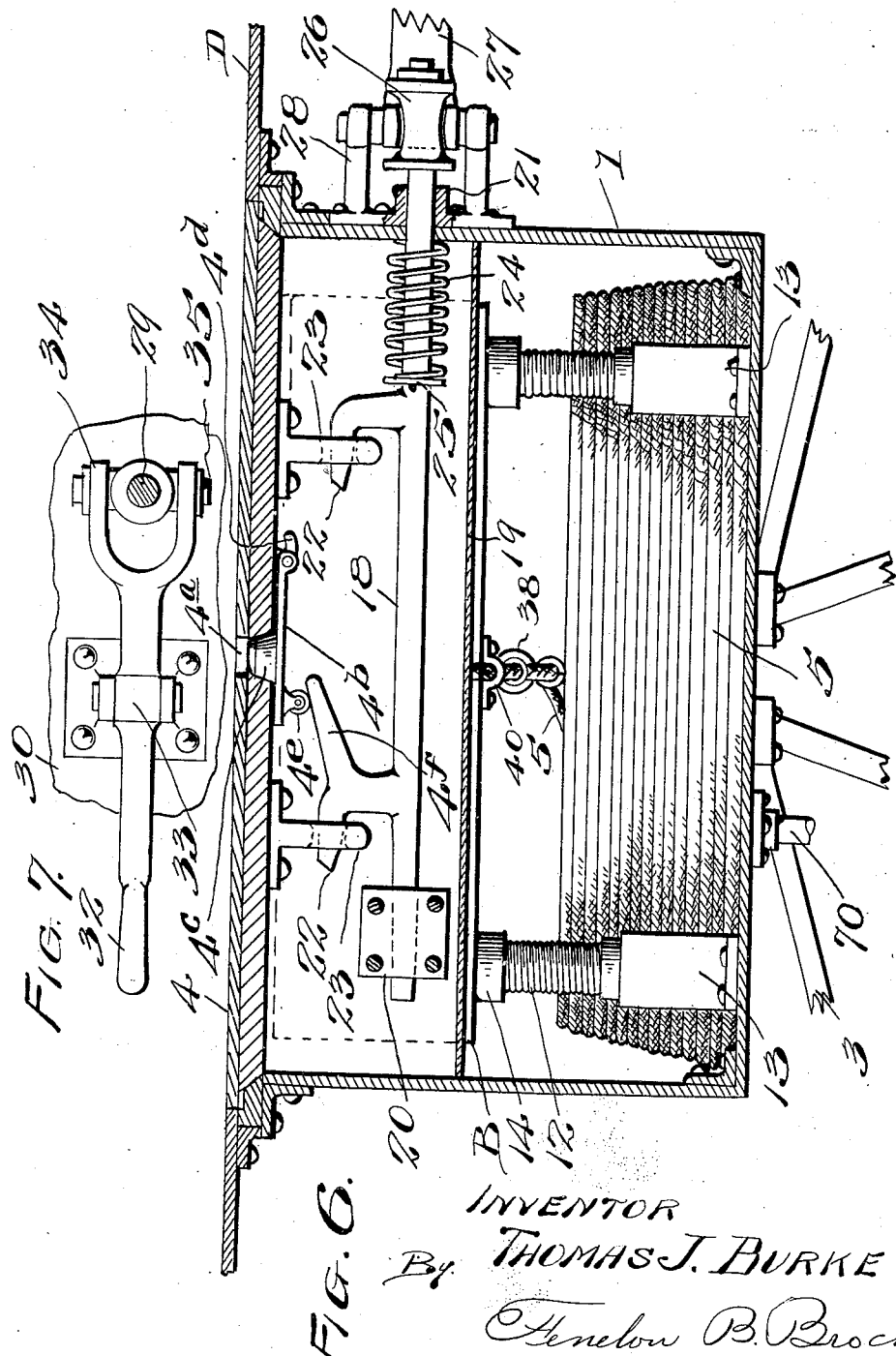

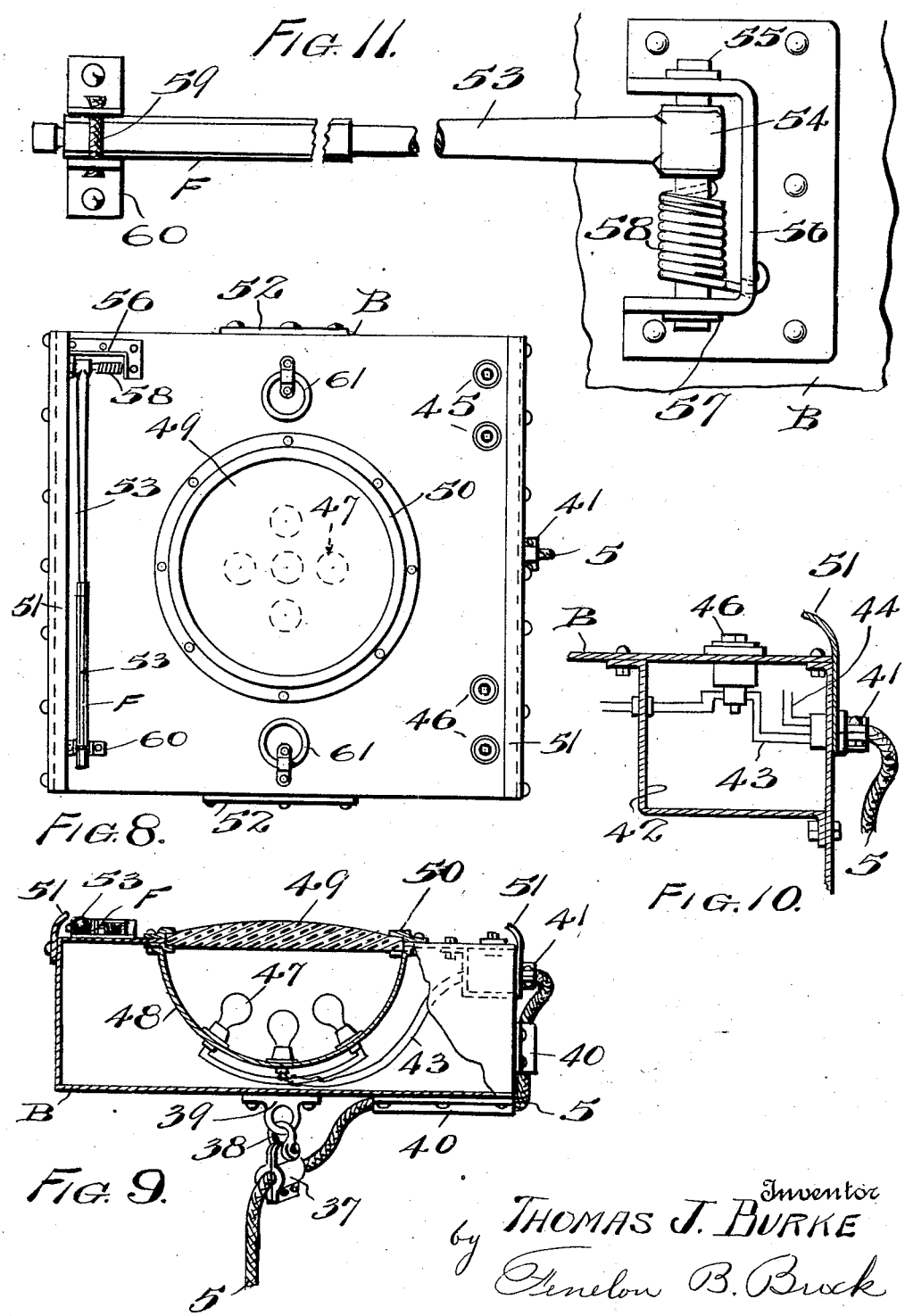

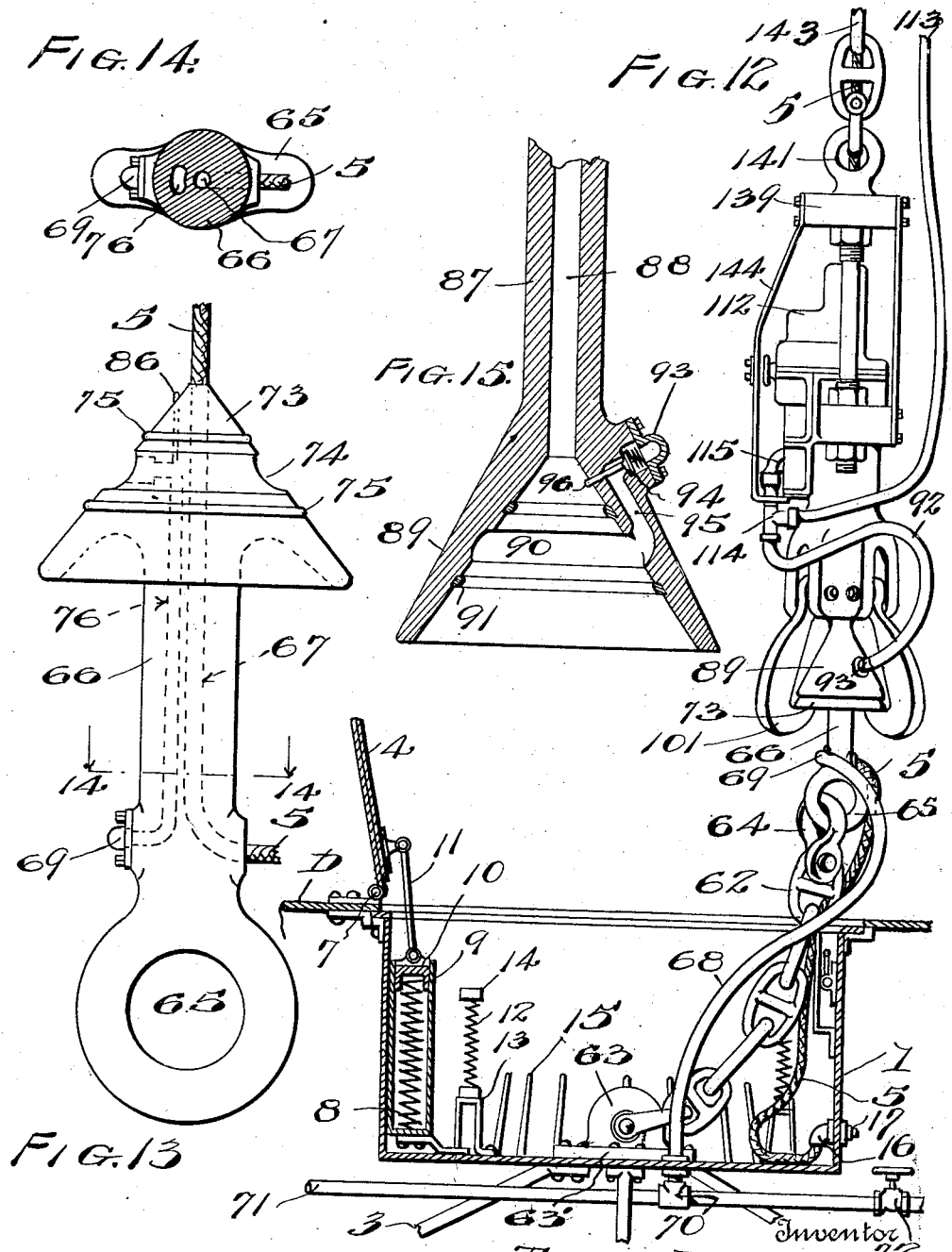

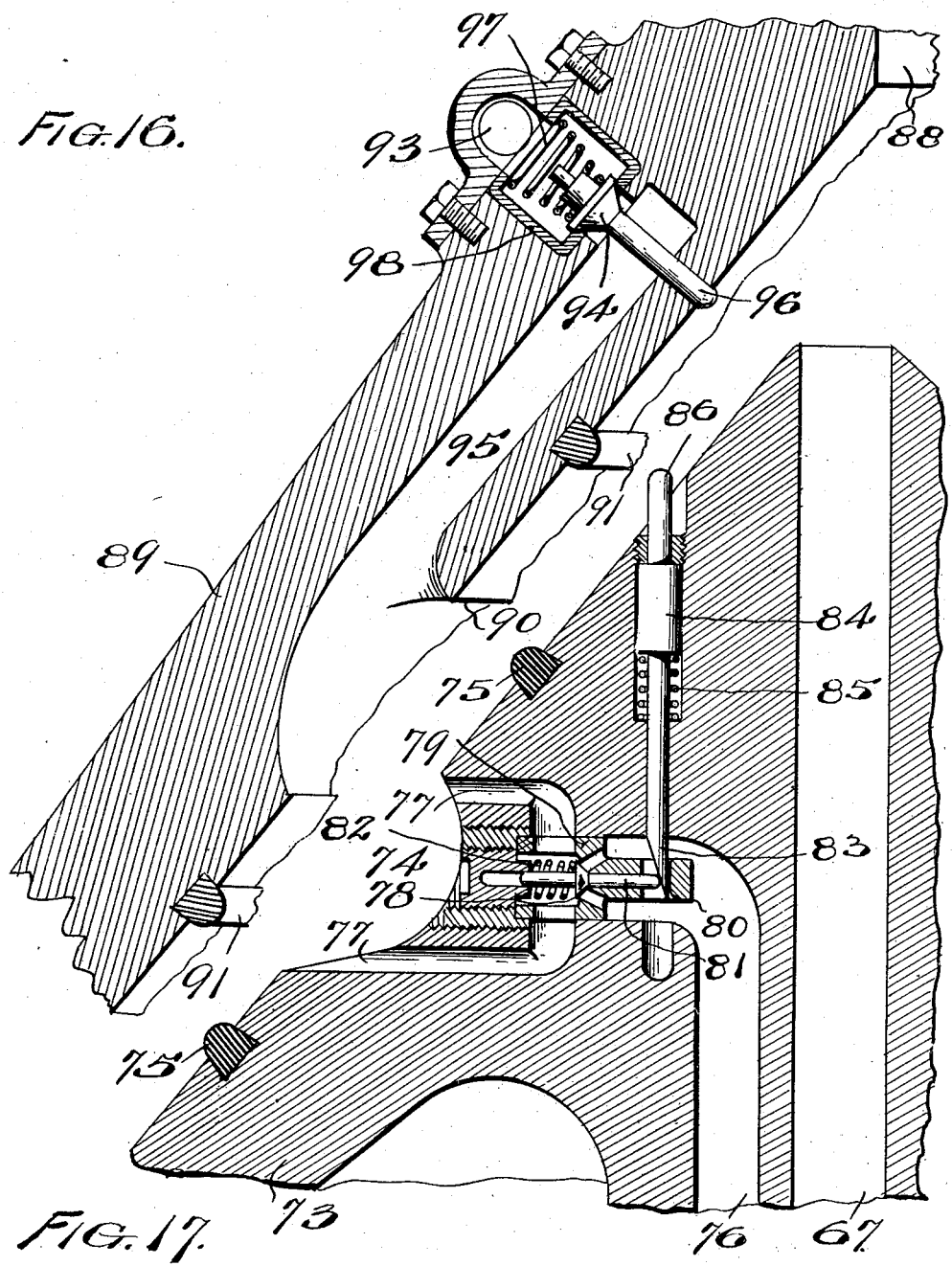

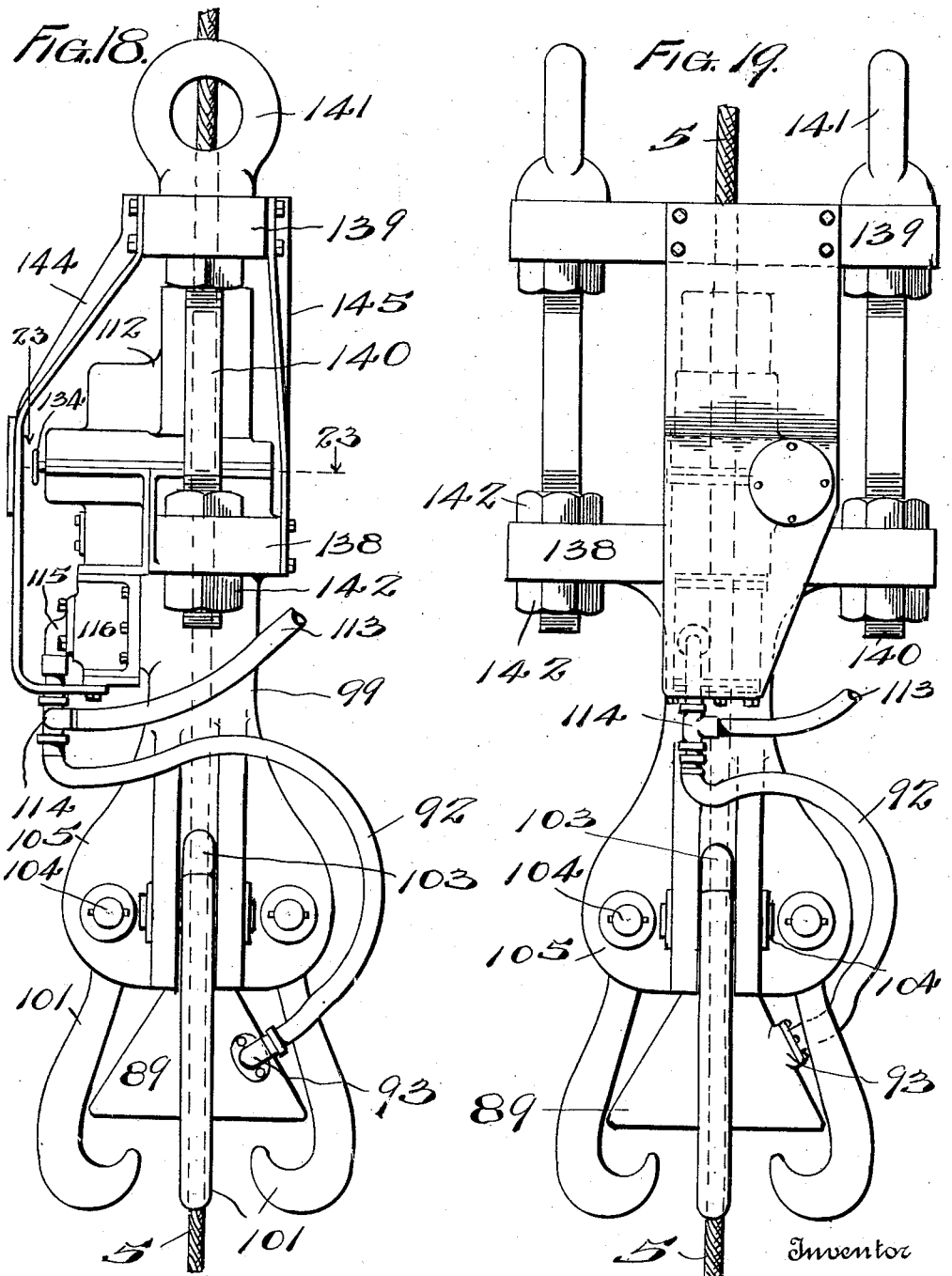

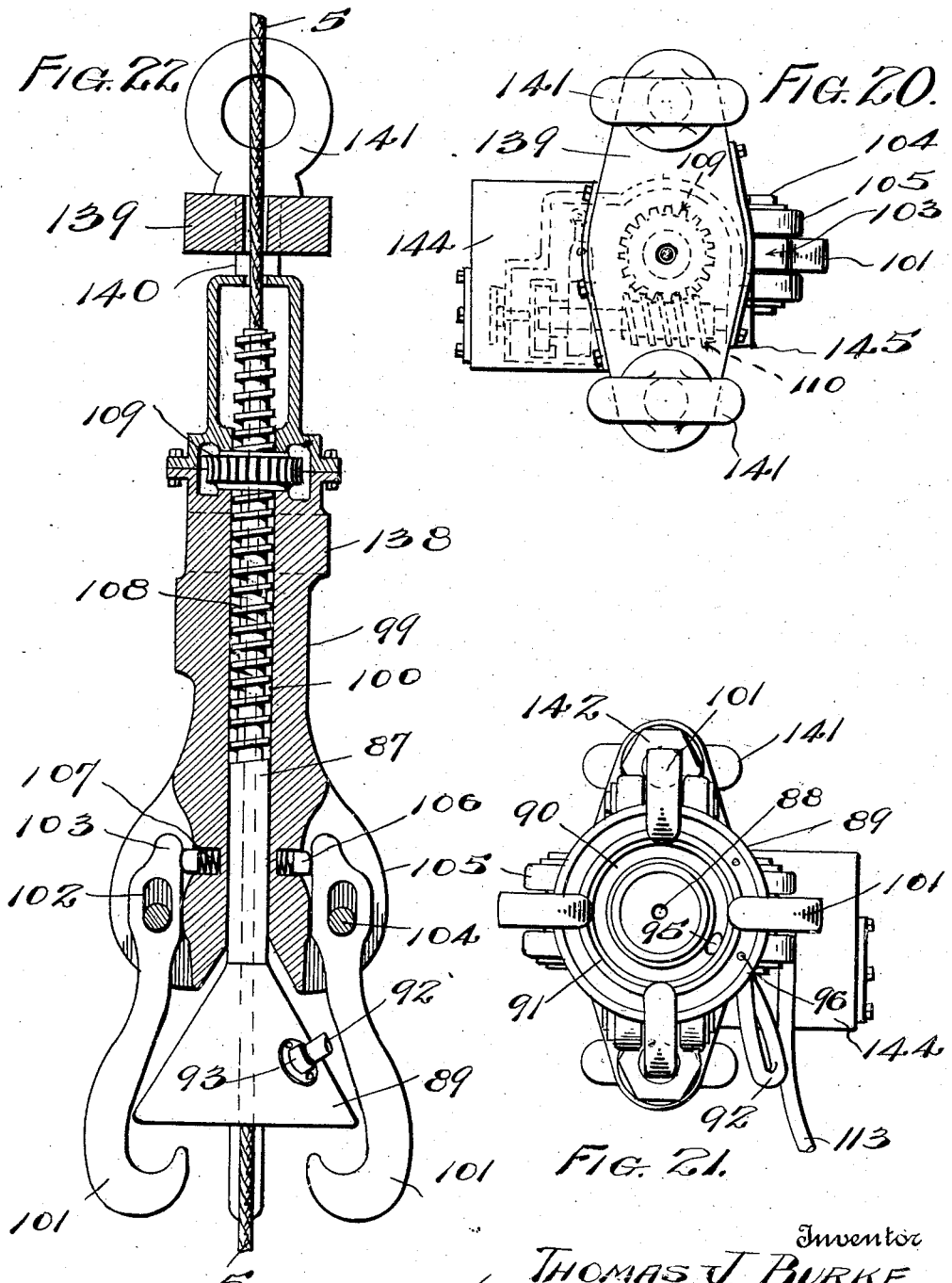

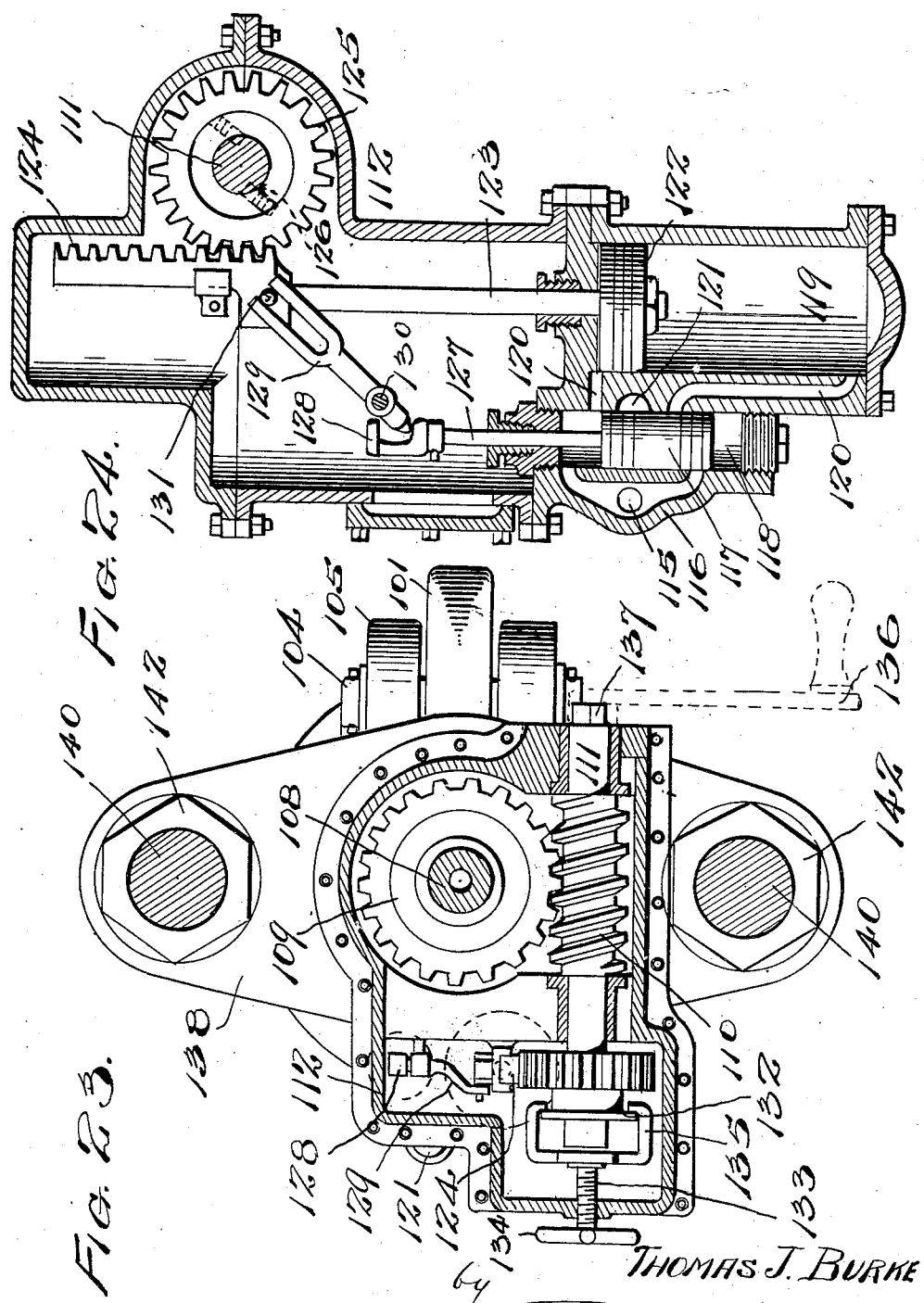

Patented Jan. 7, 1930

1,742,687

UNITED STATES PATENT OFFICE

THOMAS J. BURKE, OF NEW ORLEANS, LOUISIANA

LIFE AND VESSEL SAVING EQUIPMENT

Application filed November 26, 1926. Serial No. 150,757.

My present invention relates to improvements in life and vessel saving equipment for submarine use, and particularly to submarines carrying buoys releasable by means controlled from within the vessel. The buoys are provided with light weight guide cable, and also with signaling devices for display during both day and night to indicate the position of the submerged vessel, and means as a hose, are also provided for establishing and maintaining communication with and supplying air, liquid food, or water to the submerged vessel from a rescue or other ship.

By the utilization of the equipment of my invention, a sinking vessel or dangerously submerged one may with facility and reliability display the distress signals for a rescue ship, and the latter may with safety and surety proceed to save the lives of the crew as well as the ship.

The equipment is adapted for use in raising the submerged vessel to the surface of the water, thus eliminating the necessity for special salvaging devices, and the invention contemplates certain constructions and arrangements of parts for insuring the safety of the crew and of the submarine vessel. The invention consists in certain novel combinations and arrangements of parts as will hereinafter be more fully described and set forth in the accompanying claims.

In the drawings, I have illustrated one complete example of the physical embodiment of my invention wherein the parts are combined and arranged according to the best mode I have so far devised for the practical application of the principles of my invention.

Figure 1 is a view representing a submerged or sunken ship equipped with the apparatus of my invention and from which a pair of signal buoys have been floated and are displaying the signal flags;

Fig. 2 is a view representing a ship on the surface utilizing the equipment and in communication with a submerged vessel;

Fig. 3 is a diagrammatic view transversely of the deck portion of a submarine vessel showing a pair of safety boxes forming part of the deck structure and in which the signal buoys are normally enclosed;

Fig. 4 is a top plan view of one of the safety boxes showing its door closed and the actuating mechanism for releasing or opening the door;

Fig. 5 is a top plan view of the safety box with its door thrown open and with the buoy released therefrom;

Fig. 6 is a vertical sectional view as at line 6—6 of Fig. 5;

Fig. 7 is a detail view of the control or release lever for the door or doors of the safety box or boxes;

Fig. 8 is a top plan view of one of the signal buoys with the flag and staff in folded position;

Fig. 9 is a vertical sectional view through one of the signal buoys disclosing a signal lamp for night use;

Fig. 10 is an enlarged detail sectional view showing the distributing compartment in the buoy for the electric light and telephone connections;

Fig. 11 is an enlarged plan view showing the flag and its staff in folded position and retained by a pin of absorbent material as paper which is subject to the action of water and is adapted to release the flag and its staff when wet;

Fig. 12 is a sectional view showing an open safety box from which the buoy has been floated, and also showing the use of the automatic submarine hook and connections;

Fig. 13 is an enlarged elevation of a cone shaped coupling member showing also the cable and air connections of the coupling member;

Fig. 14 is a transverse sectional view at line 14—14 in Fig. 13;

Fig. 15 is a detail sectional view of part of the coupler of the submarine hook complementary to the hook member of Fig. 13;

Fig. 16 is an enlarged detail sectional view of the air valve connection of the socket coupling member of Fig. 15;

Fig. 17 is a similar view of the air valve connection of the coupling head of Fig. 13;

Fig. 18 is a side elevation of the automatic submarine hook, uncoupled, and disclosing Fig. 19 is a view in side elevation as seen from the left in Fig. 18;

Fig. 20 is a top plan view of the automatic implement as shown in Fig. 18;

Fig. 21 is a bottom plan view of the implement as shown in Fig. 18;

Fig. 22 is a detail vertical sectional view of part of the submarine hook showing the worm drive and screw feed, the cable and spring pressed hooks;

Fig. 23 is an enlarged sectional detail view at line 23—23 in Fig. 18 showing the worm gear and screw feed; and Fig. 24 is a detail sectional view of the air motor for coupling the elements of the submarine hook.

In order that the general arrangement and utility of the equipment may readily be understood, I have shown in the two diagrammatic views, Figures 1 and 2, a submerged submarine vessel as S, and two buoys as B and B' which are equipped with flags F. These buoys are normally carried in a pair of safety boxes 1 and 2 which are arranged flush with the deck D of the submarine as indicated in Fig. 3, and these safety boxes are preferably used in pairs as indicated. The safety boxes form part of the deck structure, and they are attached to braces or rods 3 forming part of the vessel structure so that when the doors 4 of the safety boxes are opened, the cables 5 may be attached to suitable implements on a rescue ship 6. When the upper or free end of the cable is thus anchored, the cable which is connected to the safety box as will be described, may be used to lift or raise the submerged vessel to the water surface. The strain of raising the vessel through the use of the cable is distributed uniformly to the hull or vessel structure through the braces or rods 3.

The cable 5 is preferably of steel and is fashioned with an insulated core in which are enclosed suitable telephone wires and electric light wires for use in establishing communication between the submerged vessel and the rescue ship, and the electric light wires are for the purpose of illuminating the night signal of the buoy B.

A suitable number of the safety boxes 1 and 2 may be employed and located on the deck of the vessel at suitable points, and the doors 4 which are flush with the deck of the vessel are provided with hinges 7 so that the doors may open upwardly or outwardly from the deck of the vessel. The doors are of course normally closed and both water tight and air tight joints are formed between the door and the safety box, and when released the doors are automatically thrown open through the action of a number of springs 8 as best seen in Fig. 12. These springs are located within housings 9 supported from the bottom of the safety box and within the box, and a plunger 10 is located within each housing and pivotally connected by a link 11 to the inner side of the door or lid 4. When the door is closed, the plungers 10 are forced down and the springs 8 are compressed. Then when the door is released, the springs 8 act as pushing elements to open the door in order that the buoy may be ejected from the safety box. The buoy is carried in the safety box and rests upon four ejectors each of which comprises a spring 12 anchored to a support 13 which is secured to the bottom of safety box, and the ejector head 14 secured at the upper end of the spring 12. These four ejectors as best seen in Figs. 4 and 6, support the buoy 1 when the latter is enclosed in the safety box, and when the buoy is in position the springs 12 are compressed as indicated in Fig. 6. The buoy of course is air tight and due to its buoyancy, floats or rises through the water to the surface when it is released. At the time of release the springs 12 perform the function of ejectors and give the initial start to the buoy and insure its floatation to the surface of the water.

When a vessel is submerged at considerable depth, the water pressure on the exterior of the door or hatch 4 will tend to resist the action of the springs 12 in ejecting the buoy. To overcome this condition, I provide means for admitting water to the interior of the safety box 1 to equalize the pressure inside and outside the box. For this purpose, a valve opening or hole $4^a$ is provided in the lid or hatch 4 as seen in Figs. 4 and 6. As seen best in Fig. 6, at the under side of the lid is hinged a valve plate $4^b$, and this plate is provided with a valve plug $4^c$ fixed to its upper face, and normally employed to close the valve opening or water inlet $4^a$ in the hinged lid 4. To prevent excess movement of the hinged lid $b$ it is provided at the rear of its hinge, with an abutment or stop $4^d$, and it will be apparent that the swinging movement of the hinged plate $4^b$ is limited by contact of this abutment or stop with the under face of the lid 4. The valve $4^c$ is closed simultaneously with the locking movement of the slide bolt 18. For this purpose, the free end of the valve plate $4^b$ is provided with an anti-friction roller $4^e$, and this roller is adapted to ride over the upper face of a cam arm $4^f$. This arm may be fashioned in any suitable manner, but for convenience, I have shown it as an integral part of the hook 22 on the slide bolt 18. As seen in Fig. 6, the locking movement of the slide bolt, through the co-action of the cam arm $4^f$, has pushed the valve plate upwardly against the under side of the hinged door, and consequently the valve or plug $4^c$ has been inserted in and has closed the inlet opening $4^a$.

Under normal conditions, the cable 5 is coiled within the safety box for this purpose I use an annular or circular series of pegs or pins 15. One end of the cable is attached at 16 inside the safety box, and on the outside of the safety box a plug 17 is provided for electrical connection with the telephone wires and electric light wires leading to appliances within the submarine vessel.

The hinged door 4 of the safety box is locked and controlled through manually operated devices from the interior of the vessel. For this purpose, I provide a slide bolt 18 which is located at one side of the safety box and within a compartment formed by a partition 19, to protect the contents of the safety box from the movable bolt. The bolt is slidable in a keeper 20 attached to the inside of the safety box and a slide bearing 21 is provided for the bolt in one of the walls of the box. The bolt is fashioned with a pair of spaced hooks 22, and these hooks coact with complementary eyes 23 bolted to the inside face of the hinged door or lid 4. The bolt is held in locked position as indicated in Fig. 6 by the spring 24 coiled about the bolt and interposed between a fixed washer 25 and one of the walls of the safety box. To withdraw the hooks 22 from the eyes 23 and thus release the hinged door, the bolt 18 is moved to the right in Fig. 6. For this purpose, I provide the bolt with a spool 26 fixed to its free end and located exterior of the safety box. In Fig. 4, it will be seen that a bell crank lever 27 pivoted on a bracket 28 secured to the outside of the safety box is provided with a short arm that engages the spool 26. The long arm of the bell crank lever 27 is actuated from a pull rod 29. This pull rod extends longitudinally of the submarine vessel and is slidable in the spaced bulk heads 30 or other supports. The pull rod is provided with a spool 31 similar to the spool 26 and the log arm of the bell crank lever 27 engages this spool. In Fig. 4, the connection between the pull rod and the release bolt 18 is shown for one safety box, and it will be apparent that a complementary bell crank lever 27 is used at the opposite side of the pull rod 29 to actuate a release bolt in another safety box. The pull rod 29 may be actuated from various points within the submarine vessel, and for this purpose a suitable number of release levers 32 are provided. Each of these levers is hinged as at 33 to a bulk head or other support, and a yoke 34 on the lever is adapted to coact with a pin as 35 carried on the pull rod. It will be apparent that when the lever 32 is pulled to the right in Fig. 4, that the pull rod is pulled to the left, the bell crank lever draws the bolt 18, and thus releases the hooks 22 from the eyes 23, permitting the springs to open the hinged door and allow the buoy to be launched.

The hinged door is provided with an exterior $h$ and ring 36 as in Fig. 4 and it may be of course closed manually before the vessel is submerged.

The cable 5 is connected at the under side of the buoy, and I utilize a cable clamp 37 and clevis 38 in connection with a ring plate 39 bolted or otherwise secured centrally of the bottom and exterior of the buoy. Clamp plates 40 on the bottom and side of the buoy secure the cable close to the buoy and prevent any dangling of the cable as it passes up the side of the buoy to the cable connection 41 located exterior of the buoy. Within the buoy a partition 42 forms a compartment from which the electric wires 43 and the telephone wires 44 are distributed. The telephone wires are connected to plugs 45 in the top of the buoy and the electric light wires are connected to plugs 46. The plugs 45 may be used by a rescue ship for telephonic communication with the interior of the submerged vessel through the wires in the cable. The telephone wires are connected at the top of the buoy in a water-tight telephone plug, and the plug is protected as by a screw cap and gasket, and the cap is removed only when the mother ship or rescue ship arrives and is ready to plug in on the telephone. The electric wires 43 extend to a cluster of electric lamps 47 which are enclosed within a hemispherical reflector 48. The reflector is located within the buoy as seen in Fig. 9 and a lens 49 is provided to magnify the light from these lamps, for the purpose of giving a distress signal by night. All of the joints of the buoy are of course made air tight and water tight, and packing rings as 50 are used for the lens and reflector. Along the opposite sides of the buoy are provided a pair of shield plates as 51 which are attached at the sides of the buoy and curl or curve over the ends or corners of the buoy to act as buffers when the buoy contacts with any obstruction. The buoy is provided with a pair of hand hole plates 52 which may be removed to gain access to the interior of the buoy when necessary.

For daylight signaling, each buoy is provided with a flag F, and the flag is mounted on a foldable staff 53 preferably by rings to prevent fouling of the flag. The flag staff is normally held down on the upper surface of the buoy and the flag is furled in folds between the staff and the upper face of the buoy. The staff is fashioned with a hub 54 which is fixed to a shaft 55, and the shaft is journaled in a flange plate 56 having bearings 57 for the shaft. A spring 58 is coiled about the shaft with one end anchored to the plate 56 and the other end secured to the shaft 55 and of course the spring 58 is compressed when the staff is turned down. To retain the flag and its staff in this folded position, I employ a pin 59 which is passed through a pair of perforated angle plates 60. The plates are spaced apart to permit the flag and its staff to be folded down therebetween, and the pin 59 is passed through complementary openings in the angle plates to retain the staff in folded position. This pin 59 is made of absorbent material, such as paper, and when dry possesses the required rigidity and strength to retain the staff in folded position against the tension of the spring 58. When the paper pin 59, however, absorbs water it becomes softened and is pliable, and under action of the spring 58 the flag staff 53 is unfolded and the free end of the staff by its pressure against the soft pin 59 releases the pin from the angle plate 60. Under action of the spring the flag staff is thrown to vertical position and the signal flag F is unfurled as indicated in Figs. 1 and 2.

When the buoy is discovered floating upon the surface of the water by a rescue ship as 6 it may be hoisted aboard the ship by the use of suitable mechanism applied to the two lift rings 61 secured on the top of the buoy.

Within the safety box is stowed equipment and devices that are released and extended when the buoy floats to the surface and carries the cable 5 with it. This equipment includes a short length chain 62, anchored to the eye 63 which is integral with a plate 63' bolted to the bottom of the safety box and of course located within the box. This plate 63' is secured to the stays or rods 3 forming the frame structure of the submarine vessel, and it will be seen that the strain on the chain 62 is not imposed on the safety box but is imparted to these frame rods or braces 3. By means of a clevis 64 the chain 62 is connected to an eye 65 of a coupling shank 66. This shank as seen in Fig. 13 is provided with a passage therethrough opening at one side for the cable 5. An air hose 68 is connected at 69 to this coupler shank, and the air hose passes through the bottom of the safety box and at 70 is coupled to an air pipe 71 forming part of the air or pneumatic system of the submarine vessel. A control valve 72 is indicated in this air pipe as shown in Fig. 12. The coupling member in Fig. 13 is fashioned with a tapered head 73 integral with the shank 66 and an exterior annular groove 74 is provided in this head and located between a pair of exterior packing rings 75 on the head. The shank is provided with an air passage 76 from the air connection 69 and this passage extends upwardly into the head and communicates with a plurality of laterally extending ports 77 that open into the groove 74 of the coupling head. Passage of air from these ports 77 to the passage 76 is controlled by a spring pressed valve 78 which is reciprocable in a cage 79 provided in the head, and this cage has a perforated extension 80 for the stem 81 of the valve. The valve is normally held closed by a spring 82, or is opened against pressure of the spring by means of a plunger 83 having a beveled end for coaction with the stem 81. This plunger is movable and guided in the perforated extension 80, and is provided with a head 84 in a socket in the coupling head, and a spring 85 bearing against the head 84 is designed to hold the plunger in inoperative position. The plunger is designed to be moved under impact from an object pressing against the end 86 of the plunger. This end projects beyond the periphery of the tapered head, and in Fig. 17 it will be seen that when the end 86 is pushed in flush with the surface of the head 73, the air valve 78 is opened to permit passage of air from the annular groove 74 into the passage 76 and thence by way of air hose 68 to the air pipes 71 within the submarine. The coupling member 66 is adapted to coact with a complementary member having a shank 87 through which extends an opening 88 for the cable 5. This shank is fashioned with an integral socket head or female head 89 for coaction with the tapered head 73 of the lower coupling member 66, and the interior of this socket head is fashioned with an anular groove 90 between the spaced packing rings 91, and it will be apparent that the tapered head 73 is designed for insertion in the socket head 89 for the purpose of establishing air communication with the submerged vessel. For this purpose, a hose pipe 92 is attached at 93 to the exterior of the tapered head, and a valve 94 controls communication between this connection 93 and a passage 95 which opens to the annular groove 90 of the socket head. In Fig. 16, it will be seen that the end of the valve stem 96, when the valve is closed, projects within the inner surface of the socket head, and when the exterior face of the head 73 contacts with this end 96, the valve 94 is opened. The air valve 94 is normally closed by action of the spring 97, and the spring and valve are supported in a cage 98 located in a recess or socket of the coupling head 89. In this manner, air communication is established between the two coupling members when they are secured together.

The coupling member 87 with its socket head, is supported in the body 99 of an automatic submarine hook which is slidable on the cable 5. The body 99 of the submarine hook is provided with a passage 100 therethrough for the accommodation of the coupler shank 87, and four hooks 101 are suspended from this body 99 of the submarine hook. Each hook as seen in Fig. 22, is provided with a slot 102, and a lug 103. The four hooks are pivoted to the body 99 by means of pins 104 which pass through the slots and also through perforated ears 105 of the submarine hook. These hooks 101 project down and are inturned between the socket head 89, and they are retained in this position by means of push pins 106 and their springs 107. The springs are enclosed in recesses or sockets in the body 99, and the push pins engage against the inner faces of the lugs 103 on the hooks. Under normal conditions, these springs bearing against the lugs 103 hold the hooks 101 about the socket head 89. The hooks 101 are spread apart by contact with the cone shaped or tapered head 73 of the lower coupling member as the tapered head passes into the socket head 89. When the tapered head 73 passes into the socket head 89, the hooks 101 ride over the face of the tapered head and then engage under the lower edge of the head as indicated in Fig. 12. After this snap engagement of the hooks with the coupled heads, the heads are closely engaged in a water tight and air tight manner by positive feed mechanism acting on the coupling member 87 and forcing its head 89 into close contact with the tapered head 73. For this purpose, the shank 87 is fashioned with a screw 108 at its upper end, and this screw passes through a worm wheel 109 journaled thereon and located in a suitable space near the head of the submarine hook 99. A worm screw 110 on the shaft 111 engages the gear 109, and the shaft 111 is journaled in bearings in a suitable housing 112, the shaft 111 as seen in Fig. 23 extending transversely of the screw 108.

The shaft 111 is revolved to actuate the gear 109 and through the screw 108 forces the socket head 89 downwardly into close contact with the tapered head 73 through the action of an air motor which forms a part of the submarine hook. For supplying air to the motor, an air hose 113 which is adapted to be supplied with air from the rescue ship 6 is connected to a T coupling 114, to which the short air hose 92 is also connected. The T coupling is connected to the inlet port 115 of an air chest 116 from which the air is distributed by the action of a piston valve 117 which reciprocates in the valve chamber 118 as seen in Fig. 24. The piston valve 117 controls the admission of air to the air cylinder 119, through the two ports 120 opening into opposite ends of the cylinder 119, and an exhaust port 121 is provided for the cylinder 119. The piston 122 is reciprocable in the cylinder 119 and the stem 123 of this piston is fashioned with a rack bar 124 which engages a rack wheel 125 on the worm shaft 111. This rack wheel 125 is driven in one direction only by the rack bar 124, and for this purpose is provided with a clutch device or spring pressed pawls 126 as best seen in Fig. 24, between the wheel 125 and the shaft 111. It will be apparent that the movement of the rack bar 124 is transmitted to the rack wheel 125 to turn the shaft 111, and the previously described feed action of the screw 108 is accomplished.

The piston valve 117 is fashioned with a stem 127 and at its free end this stem is provided with a head 128. A forked lever 129 which is pivoted at 130 connects the valve stem and the piston stem through the instrumentality of a pin 131 on the piston stem or rack bar.

For the purpose of reversing the action of the screw bar and resetting the feed screw, manually operated means are provided. For this purpose the rack wheel 125 is provided with a flange 132, and a screw bar 133 supported in a wall of the housing and equipped with a hand wheel 134 exterior of the housing is used to disconnect the rack wheel 125 from the rack bar 124. The screw bar 133 is provided with a yoke 135 that engages the flange 132, and by turning the hand wheel 134 as seen in Fig. 23, this disengagement may be accomplished. Then, by use of a hand crank 136, indicated by dotted lines in Fig. 23, and applied to the squared end 137 of the shaft 111, the latter shaft may be turned as desired. This hand crank 136 is detachable and may be removed when not required.

The submarine hook as a whole is provided with suspending lugs 138 which are integral with and extend laterally from the body 99 of the submarine hook. Above the lugs 138 is located a cross head 139, and eye bolts 140 connect the lugs and cross head and are provided with eyes 141. Nuts 142 are used in connection with the heads of the bolts for rigidly securing the bolts to the lugs and cross head, and a chain 143 is shown as attached to these eye bolts by means of which the submerged vessel may be raised or lifted by power applied from the ship 6 on the surface of the water.

Guard plates 144 and 145 are bolted to the air motor and other parts of the submarine hook to prevent breakage from impact with other objects.

It will be understood that after the bouy has been hoisted aboard ship, the buoy is disconnected from the cable 5 in order that the upper end of the cable may be threaded through the coupling member 87, and by this means the submarine hook as a whole and including the air motor, is arranged in position so that it may slide down the cable from the ship 6 to its complementary coupling member 66 at the lower end of the cable, as indicated in Fig. 12. The chain 143 may also be attached to the eye bolts 140 before the submarine hook is lowered, and after the parts have been coupled, the submarine may be raised or lifted as previously indicated.

It will be apparent that the buoys are provided with thin or light weight cables through which communication with the sunken vessel may be maintained, and this cable is used as a guiding means for the coupling members in order to establish communication with the sunken vessel for supplying air, water, and liquid food to the crew. Ordinarily, a hose is used for this purpose, and communication is established through the complementary coupling members of the clutch from the upper long end of the hose from the rescue ship to the short end of the hose of the submerged vessel.

Having thus fully described my invention, what I claim as new and desire to secure by Letters Patent is:—

1. The combination with a safety box closed to the interior of a ship and having a hinged lid, means for locking the lid, means for releasing the locking means, spring pressed plungers within the box and connections between the plunger and the lid for opening said lid, a buoy enclosed within the box, and ejecting means for launching said buoy when the lid is opened.

2. The combination with a safety box having a hinged door, locking means for the door and means for releasing said locking means, of a plurality of spring plungers carried by the box and pivoted links from said plungers to the door, a buoy located within the box, and a plurality of ejecting springs within the box for launching the buoy when the door is open.

3. The combination with a safety box and its hinged lid, and a pair of eyes on the inner side of the lid, of a bolt compartment and a slide bolt therein, hooks on the slide bolt for coaction with said eyes, a spool on a free end of the bolt exterior of the box, a bell crank lever engaging said spool, a pull rod engaged by said bell crank lever, and a manually operated lever for moving said pull rod.

4. The combination in a submarine coupling with a cable, of a pair of coupling members encasing the cable, air hose connected to each of said members, means for establishing air connection between said members, and means for retaining said members in coupled position.

5. In a submarine coupling the combination with a pair of coupling members and a suspending cable passing therethrough, of a tapered head and a socket head on the complementary members, air hose connected to each head, means for establishing air communication between said heads, and means for locking said heads together.

6. In a submarine coupling the combination with a pair of coupling members and a suspending cable passing therethrough, of a tapered head and a socket head on the complementary members, air hose connected to each head, means for establishing air communication between said heads, and retaining hooks carried by said coupling for holding said heads.

7. The combination of a submerged vessel and a signal buoy, an intermediate pilot cable connecting said buoy and vessel, a clutch member, a lifting means, and said clutch member guided by said pilot cable for effecting connection between the lifting means and the submerged vessel and means associated with said clutch member for establishing communication between the submerged vessel and a surface vessel for supplying air, food, etc.

8. The combination with a light weight cable, a signal buoy and a submerged vessel, of a slidable motor and a coupling member thereon, a complementary coupling member on the submerged vessel, a flexible pipe for conveying liquid, nourishment, air and water to a distressed crew in the submarine vessel, means for transferring said supplies through the coupling members, and grappling hooks to secure the coupling members together.

9. In a submarine equipment, the combination with a submerged vessel having a lifting section, a guide cable, and buoy, and a coupling member on said section, of a second lifting section on said guide cable and a complementary coupling member, a tubular connection for each lifting section, and means within the coupling members for establishing communication between said tubular sections whereby food, air, or water, may be supplied to the submerged vessel.

10. In a submarine equipment, the combination with a submerged vessel having a safety box, a buoy, and a guide cable for said buoy, a lifting section connected to said safety box, a coupling member on said section, a second lifting section on said cable and a complementary coupling member, a tubular connection for each lifting section, and means within the coupling members for establishing communication between said tubular sections, whereby food, air, or water may be supplied to the submerged vessel.

11. The combination in a submarine coupling with a cable and a pair of coupling members on said cable, of a tapered head and a complementary socket head on said members, means for establishing air communication between said heads, a plurality of retaining hooks carried by said coupling, and means for actuating one of said members to lock the heads together.

12. In a submarine coupling the combination with a cable, of a lower coupling member comprising a shank having an air passage therethrough, a tapered head on said shank and an air valve in said head, a socket head on another coupling member and an air valve in said head, a plurality of hooks for causing close engagement of said heads, an air motor on said coupling, and means actuated by said motor for closing said heads to establish air communication therebetween.

THOMAS J. BURKE.